Patented July 6, 1937

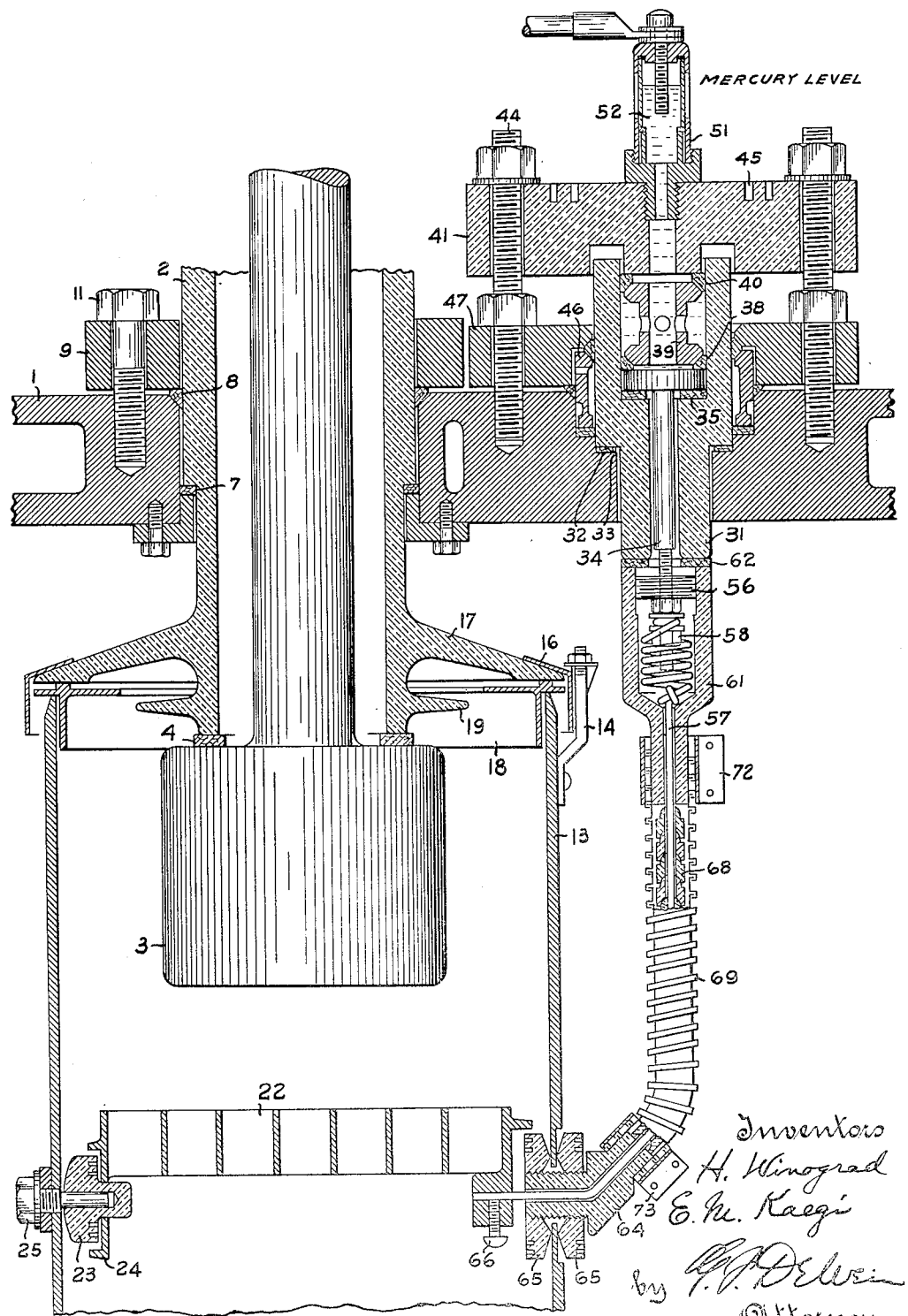

2,085,843

UNITED STATES PATENT OFFICE 2,085,843

ELECTRIC CURRENT RECTIFIER CONSTRUCTION

Harold Winograd, Milwaukee, and Emil M. Kaegi, Wauwatosa, Wis., assignors to Allis-Chalmers Manufacturing Company, Milwaukee, Wis., a corporation of Delaware Application June 20, 1932, Serial No. 618,184

1 Claim. (Cl. 250—27.5)

This invention relates to improvements in electric current rectifiers of the metallic vapor arcing type having anodes with associated control electrodes and more particularly to means for insulating the control electrodes and providing connections to the control electrodes from a source of potential external to the rectifier.

When electric current rectifiers of the metallic vapor arcing type are provided with control electrodes associated with the anodes and a potential is to be impressed on the control electrode from a suitable source arranged externally of the rectifier to permit control of the moment in the cycle of alternating current supply to the rectifier at which the arc is to be picked up by the anode, it is necessary to provide means for supporting and insulating the control electrode from the arc guide about the anode and for shielding the conductor to the control electrodes from the rectifier chamber or tank and other conductive portions of the structure, to provide means for sealing the insulated conductor in gas-tight relation with the rectifier chamber, to provide means for protecting the conductor against the action of the metallic vapor within the rectifier and to permit flexure of the conductor to allow for variations in the positions of the several portions of the entire rectifying structure under all conditions. The insulating and supporting members for the control electrodes must be designed to withstand the electrical, mechanical and thermal stresses to which they are exposed and to be effectively shielded against the vapors present in the vicinity of the anode which vapors would otherwise form a conductive deposit on the surface of the insulating members. An insulating and protective covering for the conductor to the control electrodes from the external source must be designed to protect the conductors against the high electrical and mechanical stresses to which such covering is subjected in an electric current rectifier to shield the conductor against the conductive vapors therein to avoid the danger of disturbances of the rectifying action in case of failure of the protective covering either by short circuiting of the arc to the conductor or by failure of the covering portions due to the excessive temperatures encountered which would result in failure of the action of the control electrode.

It is, therefore, an object of the present invention to provide a protective sheathing or covering for conductors leading from a suitable source of potential to a control electrode associated with an anode within an electric current rectifier of the metallic vapor arcing type.

Another object of the present invention is to provide a protective sheathing or covering for conductors leading from a suitable source of potential to a control electrode associated with an anode within an electric current rectifier of the metallic vapor arcing type in which the portion of the covering or sheath and the conductor passing through the tank may be sealed in gas-tight relation into the rectifier chamber.

Another object of the present invention is to provide a protective sheathing or covering for conductors leading from a suitable source of potential to a control electrode associated with an anode within an electric current rectifier of the metallic vapor arcing type in which the covering will be sufficiently flexible to permit variation in the positions of the several portions of the rectifying structure.

Objects and advantages other than those above set forth will be apparent from the following description when read in connection with the accompanying drawing which is a vertical sectional view of a portion of a rectifier showing the relation of an anode, an arc guide, a control electrode and a conductor to the control electrode with a protective covering for the conductor and showing the means by which the several portions are retained and sealed in their associated relation.

Referring more particularly to the drawing by characters of reference, the reference numeral 1 designates a portion of a double-walled top or cover plate of an electric current rectifier of the metallic vapor arcing type. The top is formed with a plurality of apertures therethrough to receive a hollow skirted insulator 2 extending therethrough and retained therein on an annular plate secured to the under side of the top plate and extending into the aperture therethrough. An anode 3 extends through the insulator and is formed with an enlarged portion or head which is held tightly against the lower end of the insulator, compressing a gasket 4 arranged between the insulator and the anode head, by suitable means arranged exteriorly of the rectifier which are well known and not forming a portion of the present invention, and are, therefore, not shown. The spaces between the top plate 1 and the insulator 2 are sealed in gas-tight relation by means of seals comprising gaskets 7 and 8, compressed against sealing surfaces, formed on the top plate and on the insulator, under compression by a flange 9 secured to the top plate 1 by means of studs as at 11. The space between the gaskets is preferably filled with a suitable fluid sealing medium, the sealing medium being preferably the same material as the vapor within the rectifier.

An arc guide 13 is arranged about the head of the anode and is suspended from the insulator 2 to which it is secured by means of bolts 14 engaging a flanged ring 16 resting on a skirt 17 extending laterally from the insulator 2. A second flanged plate 18 substantially in the form of a T-shaped member is arranged between the upper end of the arc guide 13 and the lower surface of the insulator skirt 17. A portion of the member 18 extends toward and substantially adjacent the periphery of a second skirt 19. The plate 18 and the skirt 19 cooperate to prevent the formation of a conductive film on the insulator 2 from the anode 3 to the arc guide 13 by the depositing on the insulator of metallic particles thrown off from the anode and the arc guide during the time when the rectifier is in operation and the anodes and arc guides are at high temperatures and particularly during the process of "forming" the rectifier as is well known.

A control electrode 22, preferably comprising a plurality of cylinders of conductive material concentrically arranged and conductively connected, is arranged within the arc guide between the head of the anode and the open end of such guide. The control electrode 22 is supported within the arc guide on a plurality of insulators 23 attached to such arc guide. It will be noted that each of the insulators 23 is somewhat spaced from the arc guide and from the control electrode, except at the control electrode supporting portion thereof, and that at least one surface of such insulators is provided with grooves to avoid the collection of metallic vapor and the formation of a conductive film thereon. A flange 24 is formed on the outer cylinder of the control electrode to surround the supporting insulator 23 in spaced relation therewith thus further shielding the surfaces within the space between the grooved surface of the insulator and the control electrode from the collection of metallic vapor and the formation of an electrically conductive path between the control electrode and the arc guide. Each of the insulators 23 is secured to the arc guide by a stud 25 screw threadedly engaging the same and extending into a recess in the insulator.

It is desired that it be possible to impress a potential on the control electrode 22 from a suitable source (not shown) exteriorly of the rectifier for the purpose of controlling the action of the arc within the rectifier as is well known. For the purpose of impressing such potential on the control electrode 22, it is necessary that a conductor extend from the source of potential to such control electrode and that such conductor be protected against electrical and mechanical stresses and against the action of the metallic vapor within the rectifier. Such protective covering or sheathing may be constructed in a plurality of ways, one particularly advantageous embodiment being shown in the present disclosure. Apertures are formed through the top plate 1 adjacent the anodes as shown. A hollow insulator 31 extends through the aperture and is retained therein, resting on a gasket 32 on a shoulder 33 formed in the wall of the aperture. A conductor 34 extends through the insulator 31 and is sealed thereagainst by a gasket 35 placed between the enlarged end of the conductor and a shoulder formed in the interior of the insulator. A gasket 38 is placed on the end of the conductor and is compressed by a spacer 39 on which a gasket 40 is placed. All of the gaskets are compressed by a block of insulating material 41 having an aperture therethrough and resting on the gasket 40 when such block is drawn downwardly by nuts threaded on studs 44 which engage with the top plate 1. The upper surface of the insulating block 41 is provided with grooves 45 to prevent the formation of an electrically conductive film thereon as will appear hereinafter. The insulator 31 is sealed into the aperture in the top plate by means of gaskets arranged about a spacer 46 and compressed against suitable sealing surfaces formed in the adjacent cooperating portions of the structure by a ring 47 arranged to be drawn toward the top plate by lower nuts threaded on studs 44. The spaces between the gaskets are preferably filled by a fluid sealing medium to form a gastight joint between the insulator 31 and the top plate of the rectifier.

A hollow member 51 having windows therein is threaded into the aperture through the insulating block 41 and serves as a terminal for the connection of the source of potential. The member 51 is filled with a conductive fluid material as indicated at 52 which fills the space about spacer 39 and the aperture and terminal member 51 thus sealing the conductor 34 in gas-tight relation with the insulator 31 and forming an electrical conductor between the end of the solid conductor 34 and the terminal member 51. The level of the fluid visible through the windows of the member 51 serves as an indication of the condition of the seal.

A nut 56, which is also threaded in the exterior surface thereof, is threaded on the lower end of the conductor 34 and the end of a flexible solid electric conductor 57 is clamped between the nut 56 and a second nut 58. A sleeve 61 of insulating material is passed over conductor 57 and retains the excess length of the conductor which is provided to permit variation in the relative positions of the several portions of the structure without breaking of the conductor. The insulating sleeve 61 is threaded on the external thread of nut 56 and is sealed in gas-tight relation with the insulator 31 by means of a gasket 62 compressed between the ends of the two portions. The end of conductor 57 extending from sleeve 61 extends through a second sleeve 64 of insulating material arranged in the wall of the arc guide and attached thereto by nuts 65 of insulating material having the more exposed surfaces thereof grooved to prevent the formation of a conductive film thereon. The end of the conductor protruding from sleeve 64 is conductively connected with the control electrode 22 by means of a set screw 66 or in any other suitable manner. The section of the conductor 57 between sleeves 61 and 64 is enclosed within insulators 68 such as "fish beads" which permit flexure of the conductor and a flexible metallic conduit 69 is arranged about such insulator. The ends of the flexible conduit extend over and are clamped on the ends of the sleeves 61 and 64 by means of suitable clamps 72 and 73.

A conductor is thus provided from the terminal 51 to the control electrode 22 and comprises an electrically conductive sealing medium 52, a solid rod of conductive material 34 and a flexible wire of conductive material 57. The portion of the conductor extending through the top plate is enclosed within a rigid insulating bushing 31 which can readily be sealed in gas-tight relation with the top plate and thus protects the conductor portion 34 against the conductive vapors in the rectifier. The portion of the conductors extending through the flexible conduit 69 is adequately protected against the effect of the metal vapor in the rectifier and is so flexible that variations in the position of the several portions of the structure are possible without the formation of mechanical stresses therein.

Although but one embodiment of the present invention has been illustrated and described, it will be apparent to those skilled in the art that various changes and modifications may be made therein without departing from the spirit of the invention or from the scope of the appended claim.

It is claimed and desired to secure by Letters Patent:

The combination with an electric current rectifying structure of the metallic vapor type having a casing forming an evacuated chamber, an anode extending into said chamber through an insulator, and an arc guide of electrically conductive material supported by said insulator and partially surrounding said anode in spaced relation therewith, of an annular member of electrically conductive material extending from said arc guide and defining with said insulator a flat relatively narrow annular groove having a depth equal to several times the width thereof so as to shield the surface of said insulator defining at least a portion of said groove from such deposit of condensate of the metallic vapors in said chamber on said insulator as would form an electrically conductive path between said arc guide and anode.

HAROLD WINOGRAD.
EMIL M. KAEGI.